(12) United States Patent
Tentorio et al.

(10) Patent No.: US 11,530,817 B2
(45) Date of Patent: Dec. 20, 2022

(54) COMBUSTOR, A TILE HOLDER AND A TILE

(71) Applicant: ROLLS-ROYCE plc, London (GB)

(72) Inventors: Luca Tentorio, Derby (GB); Juan Carlos Roman Casado, Derby (GB); Giacomo Di Chiaro, Derby (GB); Jonathan Knapton, Derby (GB); Filippo Zambon, Derby (GB); Radu Irimia, Derby (GB)

(73) Assignee: ROLLS-ROYCE plc, London (GB)

( * ) Notice: Subject to any disclaimer, the term of this patent is extended or adjusted under 35 U.S.C. 154(b) by 9 days.

(21) Appl. No.: 16/689,292

(22) Filed: Nov. 20, 2019

(65) Prior Publication Data

US 2020/0191397 A1    Jun. 18, 2020

(30) Foreign Application Priority Data

Dec. 12, 2018 (GB) ...................................... 1820207

(51) Int. Cl.
  *F23R 3/60* (2006.01)
  *F23R 3/00* (2006.01)

(52) U.S. Cl.
  CPC ................ *F23R 3/60* (2013.01); *F23R 3/002* (2013.01); *F05D 2240/35* (2013.01); *F23R 2900/00017* (2013.01)

(58) Field of Classification Search
  CPC .. F02K 1/82; F02K 1/822; F23M 5/02; F23M 5/04; F23R 3/002; F23R 3/007; F23R 3/42; F23R 3/50; F23R 3/60; F23R 2900/00017; F23R 2900/03041; F23R 2900/03042
  See application file for complete search history.

(56) References Cited

U.S. PATENT DOCUMENTS

| | | |
|---|---|---|
| 5,079,915 A | 1/1992 | Veau |
| 2005/0034399 A1 | 2/2005 | Pidcock et al. |
| (Continued) | | |

FOREIGN PATENT DOCUMENTS

| | | |
|---|---|---|
| DE | 3625056 A1 | 1/1988 |
| EP | 1 467 151 A1 | 10/2004 |
| (Continued) | | |

OTHER PUBLICATIONS

Mar. 20, 2020 Extended European Search Report issued in European Patent Application No. 19208447.3.

(Continued)

*Primary Examiner* — Scott J Walthour
(74) *Attorney, Agent, or Firm* — Oliff PLC

(57) ABSTRACT

A combustor including a combustor lining, a tile including a recess at an end defining a receiving surface, and a tile holder. The tile holder includes an elongate retaining head having a combustor surface configured to face a combustion chamber of a combustor, and a securing portion extending from the head, the securing portion being configured to secure the head to a combustor lining. The retaining head extends laterally with respect to an elongate direction of the retaining head to define a retaining surface laterally adjacent to the securing portion; and the retaining surface cooperates with the receiving surface of the tile to retain the tile against the combustor lining. There is also disclosed a tile holder and a tile.

14 Claims, 5 Drawing Sheets

(56) References Cited

U.S. PATENT DOCUMENTS

2014/0141174 A1* 5/2014 Garry .................. C23C 4/11
                                                  427/448
2016/0131362 A1* 5/2016 Vogtmann ............ F23M 5/04
                                                   60/752
2016/0161121 A1   6/2016 Chang

FOREIGN PATENT DOCUMENTS

| EP | 3 104 077 A1 | 12/2016 |
| EP | 3 104 079 A1 | 12/2016 |
| EP | 3 196 553 A1 | 7/2017 |
| EP | 3623704 A1 | 3/2020 |
| GB | 2 298 267 A | 8/1996 |
| GB | 2 380 236 B | 1/2005 |
| WO | 2015/022222 A1 | 2/2015 |

OTHER PUBLICATIONS

Jun. 11, 2019 British Search Report issued in British Patent Application No. 1820207.7.
Oct. 29, 2021 Office Action issued in European Patent Application No. 19208447.3.

* cited by examiner

COMBUSTOR, A TILE HOLDER AND A TILE

CROSS-REFERENCE TO RELATED APPLICATIONS

This specification is based upon and claims the benefit of priority from United Kingdom patent application number GB 1820207.7 filed on Dec. 12, 2018, the entire contents of which are incorporated herein by reference.

BACKGROUND

Field of the Disclosure

The present disclosure relates to a combustor having a combustor lining, a tile for lining a combustor lining and a tile holder for securing the tile to the combustor lining.

Description of the Related Art

It is generally known to line a combustor of a gas turbine engine with combustor tiles, to protect the lining of the combustor and other components, such as pressure casings, from the heat of the combustion within a combustion chamber. These tiles typically comprise effusion cooling holes in the surface to allow a film of cooling air to flow over the surface of the combustor tiles to cool them in use. The combustor tiles also typically comprise integral studs extending from a surface, to secure the tiles to the combustor lining with nuts. However, it is difficult and expensive to provide cooling holes around or through these bolts, such that cooling of the combustor tiles cannot be achieved evenly across the tile.

SUMMARY OF THE DISCLOSURE

According to a first aspect, there is provided a combustor comprising a combustor lining, a tile comprising a recess at an end defining a receiving surface, and a tile holder comprising an elongate retaining head having a combustor surface configured to face a combustion chamber of a combustor, and a securing portion extending from the head, the securing portion being configured to secure the head to a combustor lining. The retaining head extends laterally with respect to an elongate direction of the retaining head to define a retaining surface laterally adjacent to the securing portion; and the retaining surface cooperates with the receiving surface of the tile to retain the tile against the combustor lining.

According to a second aspect, there is provided a tile holder for securing a combustor tile to a combustor lining, the holder comprising an elongate retaining head having a combustor surface configured to face a combustion chamber of a combustor, and a securing portion extending from the head, the securing portion being configured to secure the head to a combustor lining. The retaining head extends laterally with respect to an elongate direction of the retaining head to define a retaining surface laterally adjacent to the securing portion, and the retaining surface is configured to cooperate with a receiving surface of a tile to retain a tile against a combustor lining.

There may be a plurality of securing portions distributed along the elongate extent of the retaining head. The securing portions may each comprise a threaded bolt protrusion and may be configured to extend through the combustor lining and receive a nut to secure the tile holder to the combustor lining.

The bolt protrusions may comprise a cooling hole through the length of the protrusion and through the corresponding portion of the elongate retaining head. The elongate head may comprise a plurality of effusion cooling holes.

The tile holder may further comprise a spacer for holding the retaining head away from a surface of the combustor lining. There may be a plurality of spacers distributed along the elongate extent of the retaining head. Each spacer may comprise a spacer protrusion extending from the elongate head and configured to abut against the combustor lining.

The retaining surface of the head may be tapered from the combustor surface in a direction towards the securing portion.

The elongate head may comprise a retaining wing on at least one lateral side of the elongate direction to define the retaining surface.

The tile holder may comprise a retaining protrusion extending from the wing and defining the retaining surface, so as to define a cooling channel between the wing, the retraining protrusion and the combustor lining in use. The or each retaining protrusion may comprise cooling holes. The retaining protrusion may be elongate along the length of the retaining head or there may be a plurality of retaining protrusions along the length of the retaining head.

The wing may comprise cooling holes.

According to a third aspect, there is provided a tile for lining a combustor lining and configured to be secured to a combustor lining with a tile holder in accordance with the second aspect, wherein the tile comprises a recess at an end defining a receiving surface configured to cooperate with the retaining surface of the holder.

A taper may be a recess. The tile may have a slot, and the end may delimit the slot.

The combustor in accordance with the first aspect may have a tile holder in accordance with the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement)

for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the accompanying drawings, in which.

DETAILED DESCRIPTION OF THE DISCLOSURE

Aspects and embodiments of the present disclosure will now be discussed with reference to the corresponding drawings. Other aspects and embodiments will be apparent to those skilled in the art.

Figure 1:
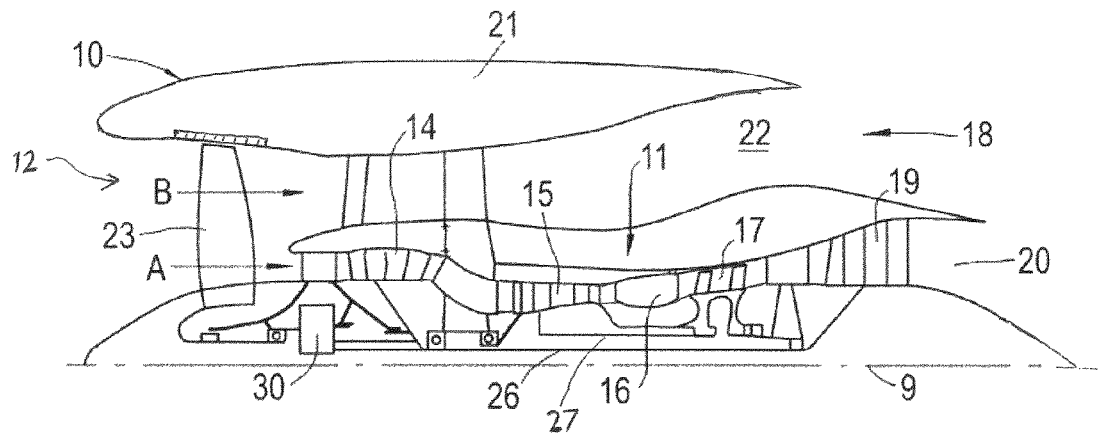
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
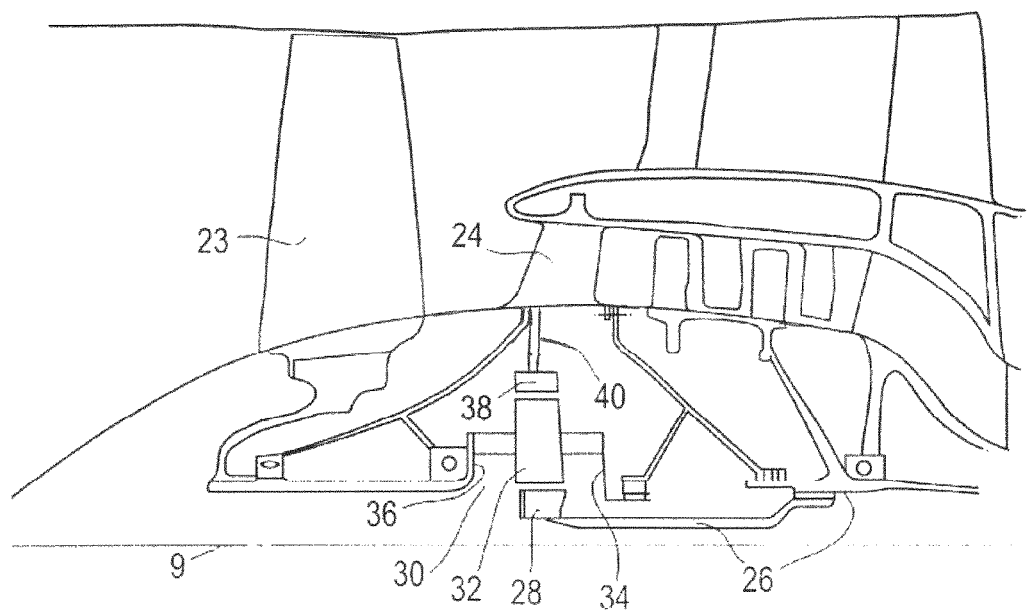
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
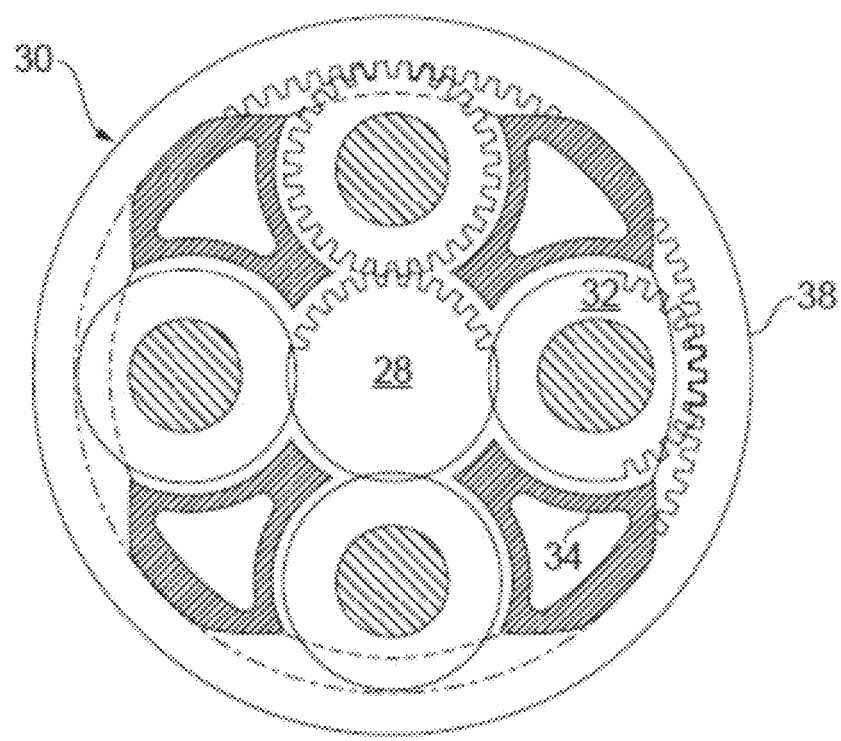
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure.

Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
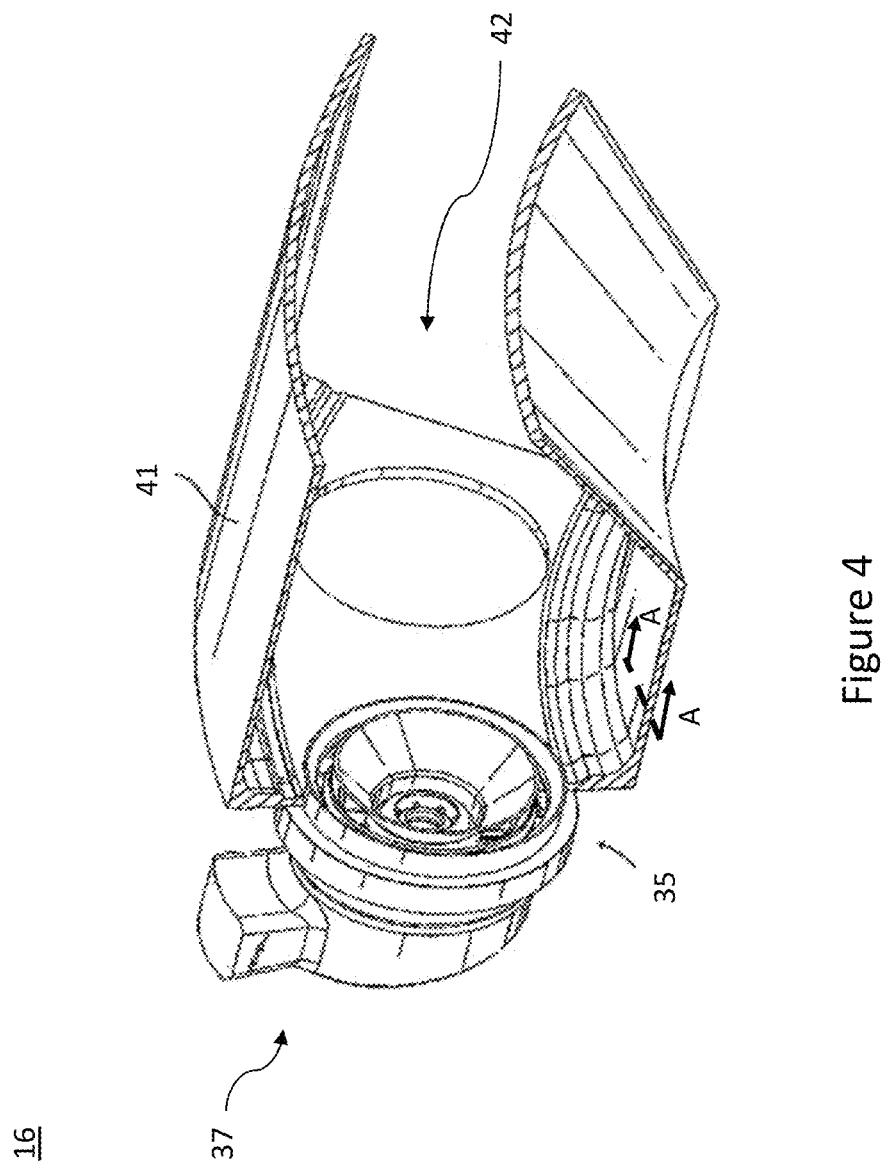
FIG. 4 schematically shows a cutaway view of combustion equipment in the gas turbine engine.

FIG. 4 shows the combustion equipment 16 in this example in more detail. The combustion equipment 16 includes a combustor 41 having an annular combustion chamber 42. An opening 35 at an upstream end of the combustor 41 is configured to receive a fuel spray nozzle 37 which is configured to spray fuel into the combustion chamber 42. The fuel is mixed with air and combusted in the combustion chamber 42. The temperature of gases released by combustion can reach up to 2100 degrees Celsius.

Figure 5B:
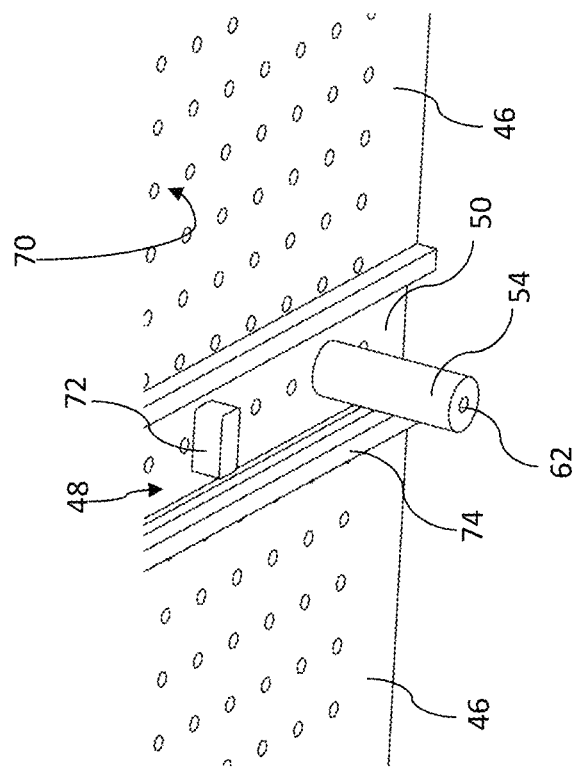
FIG. 5B schematically shows an isometric outer view of the first example combustor tiles and tile holder.
Figure 5A:
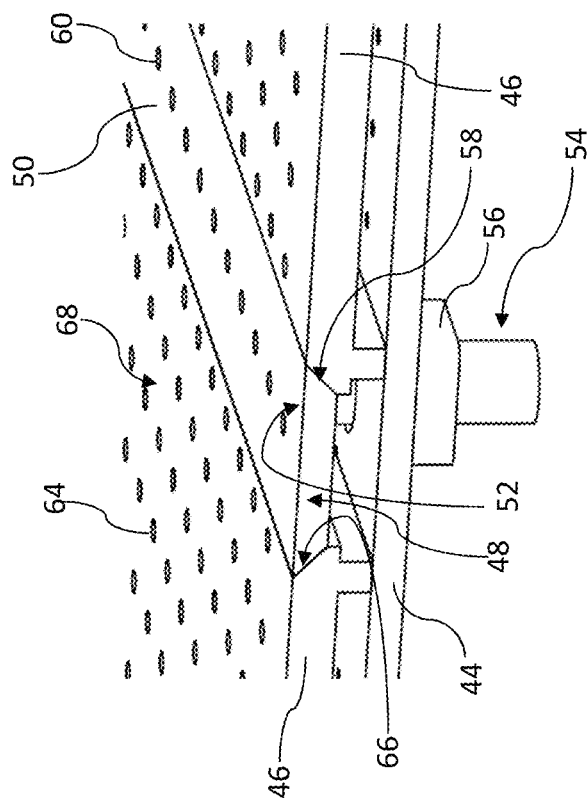
FIG. 5A schematically shows an isometric cross-sectional view of a portion of a combustor along line A-A on FIG. 4, having a first example tile holder and combustor tiles.

FIG. 5A shows a cross-sectional view of a portion of the combustor 41 looking in a downstream direction of the combustor in more detail along the line A-A on FIG. 4. The combustor 41 comprises a combustor lining 44 defining the annular chamber, which is protected from the temperature of gases released by combustion in the combustion chamber by a plurality of combustor tiles 46 disposed on an inner surface of the combustor lining 44.

The combustor 41 comprises a plurality of tile holders 48 disposed between the tiles 46 on an inner surface of the combustor lining 44 to secure the tiles 46 to the combustor lining 44. FIG. 5A only shows a portion of the combustor lining 44 with two tiles 46 and one tile holder 48. FIG. 5B shows a view of the outer side of the two combustor tiles 46 and the tile holder 48, without the combustor lining 44. In this disclosure, references to "inner" and "outer" are used with reference to the combustion chamber. Therefore, an inner side is a side facing towards or closer to the combustion chamber, and an outer side is the side facing away from, or furthest away from the combustion chamber. The inner side may also be known as the 'hot' side (i.e. facing the hot interior of the combustion chamber) and the outer side may be known as the 'cool' side (i.e. facing outwardly from the hot interior of the combustion chamber).

The holder 48 comprises an elongate retaining head 50 extending linearly in an elongate direction. As shown in FIG. 5A, in this example the tile holder 48 is configured to be secured to the combustor lining 44 such that the elongate direction is aligned with the axial direction of the engine. The retaining head 50 comprises a head combustor surface 52 on an inner surface of the holder 48 which is configured to face the combustion chamber.

The retaining head 50 comprises a plurality of effusion cooling holes 60 which extend through the retaining head 50. In this example, the plurality of effusion cooling holes 60 in the retaining head 50 are provided in a single line along the elongate direction of the retaining head 50. In other examples, the effusion cooling holes 60 may be distributed in any suitable array on the retaining head 50.

The tile holder 48 comprises a plurality of securing portions 54 (only one is shown in FIG. 5A) which extend from the retaining head 50 and which are configured to secure the retaining head 50 to the combustor lining 44. The plurality of securing portions 54 are discrete portions which are distributed along the elongate direction (or length) of the retaining head 50, and which extend from the side of the retaining head 50 opposing the head combustor surface 52, i.e. the outer side. In this example, the securing portions 54 each comprise a bolt protrusion which protrudes from the retaining head 50 and which is threaded, and a nut 56. The bolt protrusion is configured to extend through the combustor lining 44 and to receive the nut 56 to secure the tile holder 48 to the combustor lining 44. The combustor lining 44 comprises a series of corresponding apertures through which the securing portions 54 extend in use.

The bolt protrusions each comprise a cooling hole 62 extending through the length of the protrusion and through the corresponding portion of the retaining head 50. In this example, the cooling hole 62 through each of the bolt protrusions aligns with a respective effusion cooling hole 60 in the retaining head 50.

The holder 48 further comprises a plurality of spacers 72 (seen in FIG. 5B which shows only a single spacer 72) which extend from the retaining head 50 from the same side as the securing portions 54. The spacers 72 are distributed along the elongate extent of the retaining head 50 and are configured to hold the retaining head 48 from the surface of the combustor lining 44, when the retaining head 50 is secured to the combustor lining 44, so as to define a cooling space between the retaining head 50 and the combustor lining 44. The spacers 72 comprise a spacer protrusion which is configured to abut the surface of the combustor lining 44.

The retaining head 50 extends laterally with respect to the elongate direction of the head 50 to define a retaining surface 58 laterally adjacent to the securing portion 54. In this example the retaining head 50 is configured such that the retaining surface 58 tapers from the head combustor surface 52 in a direction towards the securing portions 54, so as to face outwardly in use. The retaining surface 58 is configured to cooperate with a receiving surface of the tiles 46 which will be explained in more detail below.

The combustor tiles 46 are configured to line the combustor lining 44 and to protect the combustor lining 44 from the heat in the combustion chamber in use. Each tile 46 comprises a tile combustor surface 68 which is configured to face the combustion chamber in use, and a lining surface 70 on an opposing side to the tile combustor surface 68, which is configured to face the combustor lining 44 in use. Each of the tiles 46 comprise a plurality of effusion cooling holes 64 through the tile from the lining surface 70 to the tile combustor surface 68, which are evenly distributed around the tile 46. The effusion cooling holes may be normal to the tile combustor surface, or may be angled with respect to the normal of the tile surface. In other examples, the effusion cooling holes may be distributed unevenly, such as by providing more cooling holes in an area where more cooling is required.

Each tile 46 comprises a spacing rail 74 at an end to hold the tile 46 away from the combustor lining 44. The spacer rail 74 abuts the combustor lining 44 in use and holds the lining surface 70 of the tile 46 offset from the combustor lining 44, thereby defining a cooling space between the tile 46 and the combustor lining 44. In other examples, the tile may be held away from the combustor lining by a plurality of discrete spacers, so that the cooling space between the tiles 46 and combustor lining 44 is fluidically connected to the cooling space between the retaining head 50 and the combustor lining 44.

The tile 46 comprises a recess at an end which defines a receiving surface 66. In this example, the receiving surface 66 of each of the tiles 46 tapers from the lining surface 70 to the tile combustor surface 68 so that it faces generally inwardly in use. The receiving surface 66 is configured to cooperate with the retaining surface 58 of the holder 48 so that the retaining head 48 retains the tile 46 against the combustor lining 44 when the retaining head is secured to the combustor lining 44 with the securing portion 54. It should be understood that, in this example, the receiving surface 66 generally takes the form of a chamfered edge of the tile 46 which cooperates with a retaining surface 58 generally formed by a correspondingly chamfered edge of the securing portion 54 to thereby retain the tile 46.

In use, the tile holder 48 and the tile 46 are configured so that the head combustor surface 52 and the tile combustor surface 68 are flush when the holder 48 secures the tiles 46 to the combustor lining 44. Therefore, the tile holder 48 and tile 46 define a single, flush combustor surface to face the combustion chamber to protect the combustor lining 44 from the heat in the combustion chamber in use.

Having a tile holder 48 as described to secure tiles 46 to a combustor lining 44, rather than having integral bolts extending from a tile, which secure a tile to a combustor lining, ensures that cooling holes can be distributed more evenly across the combustor surface. In previously considered systems, the integral bolts on a tile may produce "shadow zones" which are areas where a laser cannot drill a hole into the tile without damaging the bolt. This shadow zone is particularly notable when the cooling holes are drilled at an angle to the normal of the tile, such that a laser would drill a hole in the bolt if done within the shadow zone. Having a separate tile holder as described allows the holes to be drilled much closer to the edge of the tile, and therefore much closer to the bolt when assembled, because there is no shadow zone on the tile. Therefore, there will be more even cooling of the combustor tiles 46 in use, thus providing more efficient cooling of the whole combustor tile.

Further, having a separate tile 46 and tile holder 48 means that they can be made of different materials, such as steel or ceramic. Therefore, the materials can be chosen to balance the cost, heat performance and weight of the tile holders 48 and tiles 46 to provide an optimal solution.

Furthermore, in previously considered systems, there are gaps between combustor tiles in order to accommodate thermal expansion of the tiles in use. This disrupts the flow of cooling air, such that it is less efficient. However, in this example, no such gaps are required between the tiles and the tile holders, as the thermal expansion can be better accommodated by the tapered retaining and receiving surface while maintaining contact therebetween. Therefore, the cooling air can be used more efficiently to cool the tiles or to better control the combustion process.

FIGS. 6A-6D show cross sectional views of various example tile holders, with corresponding tiles attached to a combustor lining 44.

Figure 6A:
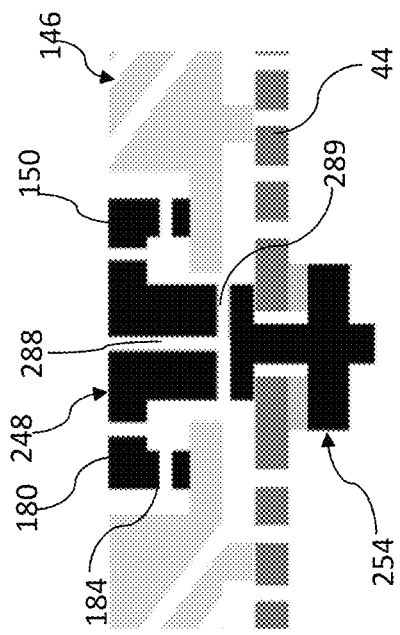
FIGS. 6A-6D schematically show cross sectional views of a combustor with second, third, fourth, and fifth example tile holders.

FIG. 6A shows a second example tile holder 148 securing corresponding second example tiles 146 to a combustor lining 44.

The second example tile holder 148 shares some features with the first example holder 48. It comprises a retaining head 150 extending along an elongate direction and defining a head combustor surface 152 configured to face the combustion chamber. The holder 148 comprises a securing portion 154 which shares some features with the securing portion 54 of the first example tile holder 48, such as the bolt and nut, but does not have a cooling hole extending through the bolt protrusion.

The retaining head 150 comprises a pair of retaining wings 180 extending on lateral sides of the securing portion 154 with respect to the elongate direction of the retaining head 150 to define a retaining surface 158 laterally on either side of the securing portion 54. In other examples, the retaining head 50 may have a single retaining wing laterally extending on only one side of the securing portion 54.

The retaining wings 180 extends laterally along the whole elongate extent of the holder 148. The retaining wings 180 each comprise a retaining protrusion 184 extending from the respective retaining wing 180 in the same direction as the securing portion 154. The retaining protrusion 184 defines the retaining surface 158 and holds the retaining head 150 away from the combustor lining 44 so as to define a cooling channel 182 between the wing 180, retaining protrusion 184 and the combustor lining 44 in use.

In this example, the retaining protrusion 184 on each retaining wing 180 extends along the elongate length of the retaining wing 180. In other examples, there may be a plurality of discrete retaining protrusions on each retaining wing, distributed along the elongate extent of the retaining head, such that the cooling channel defined between the wing, the retaining protrusion and the combustor lining is fluidically connected to the cooling space between the tile and the combustor lining in use.

In this example, the second example tile 146 shares some features with the first example tile 46, but differs in that the cooling holes extend diagonally through the tile 146. Further, the tile 146 comprises a receiving surface 166 which is defined by a recess at an end of the tile 146. In this example, the receiving surface 166 is configured to be parallel to the combustor lining 44 in use, and to face the combustion chamber in use.

Each retaining wing 180 of the second example holder 148 comprises cooling holes 186. The cooling holes 186 in this example are distributed in a line along the length of each retaining wing 180. The retaining protrusions 184 in this example comprise a plurality of cooling holes distributed along the length of each retaining wing 184 to fluidically connect the cooling channel 182 with the cooling space between the tile 146 and the combustor lining 44 in use. In other examples, there may be no cooling holes on the retaining wings.

In this example, the retaining protrusions 184 behave as the spacers do in the first example tile holder 48. Therefore, there is no need for the spacers in this example. Although in some examples there may also be spacers similar to those on the first example tiles holder 48.

The retaining protrusions 184 in this example are configured to be laterally spaced from the wall of the tiles so as to accommodate thermal expansion of the components in use.

Figure 6B:
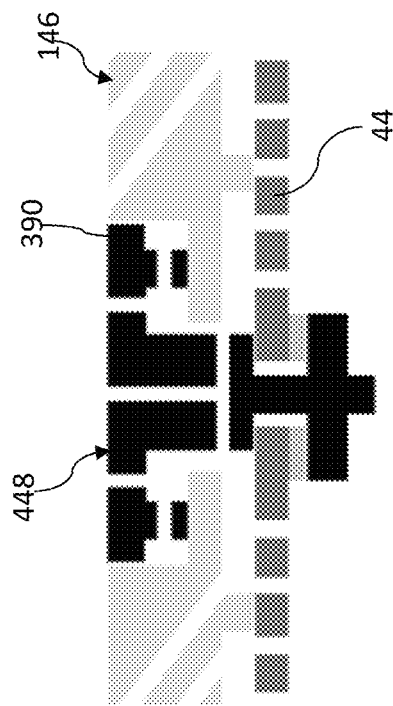

FIG. 6B shows a third example tile holder 248 securing the second example tiles 146 to a combustor lining 44.

The third example tile holder 248 shares some features with the second example tile holder 148 in that it has the a retaining head 150 with retaining wings 180 and retaining protrusions 184 as the second example tile holder 148. The third example tile holder 248 further comprises a third line of cooling holes between the cooling holes on each retaining wing 180.

The third example tile holder 248 also comprises a securing portion comprising a threaded bolt protrusion which is configured to extend through the combustor lining 44 in use to secure the tile holder 248 to the liner 44.

The bolt protrusion of the securing portion 254 comprises a cooling hole 288 extending part of the way along the length of the bolt protrusion which is aligned with a cooling hole in the third line of cooling holes in the retaining head. A further cooling hole 289 extends through the width of the bolt protrusion and connects with the cooling hole 288 through the length of the bolt protrusion.

Figure 6C:
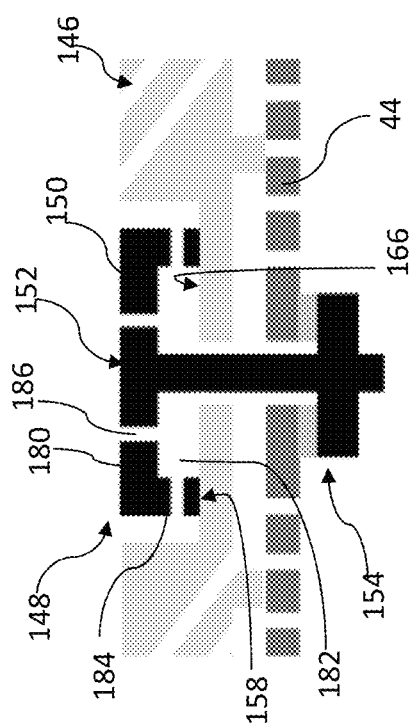

FIG. 6C shows a fourth example tile holder 348 securing the second example tiles 146 to a combustor lining 44.

The fourth example tile holder 348 shares some features with the third example tile holder 248 but differs in that it further comprises a lateral protrusion 390 extending laterally from each retaining protrusion 184. The lateral protrusions 390 extend along the elongate extent of the retaining protrusions 184. The lateral protrusions 390 are provided on the retaining protrusions furthest from the combustor surface 152, so that they extend the retaining surface 358 of the retaining head 150, and so as to laterally hold the tile 146 away from the holder 348.

Figure 6D:
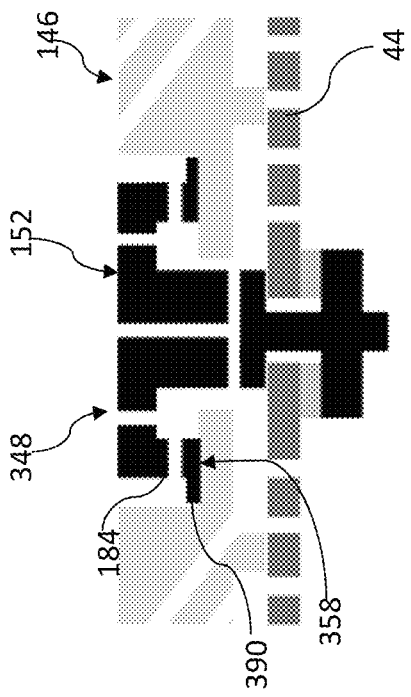

FIG. 6D shows a fifth example tile holder 448 securing the second example tiles 146 to a combustor lining 44.

The fifth example tile holder 448 shares some features with the fourth example tile holder 348, but differs in that the lateral protrusions 390 extend from the combustor surface of the retaining head.

Although it has been described that the holder has a retaining head which extends linearly in an elongate direction, it should be appreciated that the elongate direction may be the local direction in which the head extends at a given point. As such, the retaining head may not extend linearly, but rather, may have a curve, or may extend with any suitable profile to position tile borders at regions in the combustion chamber with expected lower temperatures.

Although it has been described that the tile holders are configured to hold tiles at their ends, in other examples, the end may be defined by a slot within a tile, wherein the tile holder is configured to sit within the slot to secure the tile to the combustor lining.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A tile holder configured to be used for securing a combustor tile to a combustor lining, the tile holder comprising:
   an elongate retaining head having a combustor surface configured to face a combustion chamber of a combustor, and a pair of retaining surfaces each located on a respective lateral side of the elongate retaining head, the pair of retaining surfaces being located adjacent to the combustor surface on each lateral side of the combustor surface, an entirety of the pair of retaining surfaces being configured to be spaced apart from the tile on each lateral side of the elongate retaining head forming a gap along an entire longitudinal length of the elongate retaining head between the respective retaining surface and the tile, and
   a securing portion extending from the elongate retaining head, the securing portion being configured to secure the elongate retaining head to a combustor lining, the securing portion including a first cooling hole extending only partially within a length of the securing portion, which intersects with a second cooling hole that extends through a width of the securing portion and connects with the first cooling hole through the length of the securing portion, and including third cooling holes that extend through the elongate retaining head at the combustor surface and on opposed sides of the securing portion between the pair of retaining surfaces, wherein:
   the elongate retaining head extends laterally with respect to an elongate direction of the elongate retaining head to define the retaining surface laterally adjacent to the securing portion; and
   the retaining surface is configured to cooperate with a receiving surface of the tile to be configured to retain the tile against the combustor lining.

2. The tile holder according to claim 1, further comprising a plurality of securing portions, including the securing portion, distributed along the elongate extent of the elongate retaining head, the plurality of securing portions each including a threaded bolt protrusion and configured to extend through the combustor lining and receive a nut to secure the tile holder to the combustor lining.

3. The tile holder according to claim 2, wherein the plurality of bolt protrusions each include the first cooling hole only partially through the length of each of the plurality of bolt protrusions and through a corresponding portion of the elongate retaining head.

4. The tile holder according to claim 1, wherein the elongate retaining head includes a plurality of effusion cooling holes.

5. The tile holder according to claim 1, further comprising a spacer for holding the elongate retaining head away from a surface of the combustor lining.

6. The tile holder according to claim 5, further comprising a plurality of spacers distributed along the elongate extent of the elongate retaining head, each spacer of the plurality of spacers including a spacer protrusion extending from the elongate retaining head and configured to abut against the combustor lining.

7. The tile holder according to claim 1, wherein the retaining surface of the elongate retaining head is tapered from the combustor surface in a direction towards the securing portion.

8. The tile holder according to claim 1, wherein the elongate retaining head includes a retaining wing on at least one lateral side of the elongate direction to define the retaining surface.

9. The tile holder according to claim 8, further comprising a retaining protrusion extending from the retaining wing and defining the retaining surface, so as to define a cooling channel between the retaining wing, the retaining protrusion, and the combustor lining in use.

10. The tile holder according to claim 9, wherein the or each retaining protrusion includes a plurality of cooling holes.

11. The tile holder according to claim 9, wherein the retaining protrusion is elongate along a length of the elongate retaining head, or the tile holder further comprises a plurality of retaining protrusions, including the retaining protrusion, along the length of the elongate retaining head.

12. The tile holder according to claim 8, wherein the retaining wing includes a plurality of cooling holes.

13. The tile holder according to claim 1, wherein at least one of the pair of retaining surfaces is configured to cooperate with a recess at an end defining the receiving surface.

14. A combustor comprising:
a combustor lining;
a tile including a recess at an end defining a receiving surface; and
a tile holder including:
an elongate retaining head having a combustor surface configured to face a combustion chamber of the combustor, and a pair of retaining surfaces each located on a respective lateral side of the elongate retaining head, the pair of retaining surfaces being located adjacent to the combustor surface on each lateral side of the combustor surface, an entirety of the pair of retaining surfaces being spaced apart from the tile on each lateral side of the elongate retaining head forming a gap that spans an entire height and an entire elongate length of the elongate retaining head between the respective retaining surface and the tile, and
a securing portion extending from the elongate retaining head, the securing portion being configured to secure the elongate retaining head to the combustor lining, wherein:
the elongate retaining head extends laterally with respect to an elongate direction of the elongate retaining head on each respective side of the elongate retaining head to define the pair of retaining surfaces laterally adjacent to the securing portion;
cooling holes extend through the elongate retaining head at the combustor surface and on opposed sides of the securing portion between the pair of retaining surfaces; and
the retaining surface cooperates with the receiving surface of the tile to retain the tile against the combustor lining.

* * * * *